United States Patent [19]

Taghezout

[11] Patent Number: 4,772,840

[45] Date of Patent: Sep. 20, 1988

[54] METHOD AND ARRANGEMENT FOR CONTROLLING A STEPPING MOTOR

[75] Inventor: Daho Taghezout, Lausanne, Switzerland

[73] Assignee: Asulab, S.A., Bienne, Switzerland

[21] Appl. No.: 67,240

[22] Filed: Jun. 25, 1987

[30] Foreign Application Priority Data

Jul. 2, 1986 [CH] Switzerland ........................ 02656/86

[51] Int. Cl.[4] ............................................... H02P 8/00

[52] U.S. Cl. ...................................... 318/696; 318/685

[58] Field of Search ................................ 318/696, 685

[56] References Cited

U.S. PATENT DOCUMENTS

| | | | |
|---|---|---|---|
| 4,430,007 | 2/1984 | Wiget et al. | 368/157 |
| 4,439,717 | 3/1984 | Berney | 318/696 |
| 4,468,602 | 8/1984 | Antognini et al. | 318/696 |
| 4,542,329 | 9/1985 | Tu Xuan | 318/696 |
| 4,568,867 | 2/1986 | Remus et al. | 318/696 |
| 4,590,412 | 5/1986 | Mokdad et al. | 318/696 |

OTHER PUBLICATIONS

10th Congres International de Chronometrie, No. 1, Sep. 10, 1979, pp. 73–80, Buren, CH; A. Pittet et al.: "Amelioration de la Fiabilite et de la Consommation d'Energie de Moteurs pas a pas par une Technique d'Auto-Controle".

Patent Abstracts of Japan, vol. 7, No. 164 (p-211), Daini Seikusha K.K. and Hiroyuki Odagiri.

*Primary Examiner*—William M. Shoop, Jr.
*Assistant Examiner*—Saul M. Bergmann
*Attorney, Agent, or Firm*—Davis Hoxie Faithfull & Hapgood

[57] ABSTRACT

The method of this invention includes measuring the quantity Eme of electrical energy converted into mechanical energy by the motor during a driving pulse, determining the time required for said quantity of energy to attain a reference value $E_{ref}$ and interrupting the driving pulse as a function of such time.

The arrangement includes means for measuring said quantity Eme of energy, means for determining the time required for such quantity of energy to attain such reference value $E_{ref}$ and means for effecting interruption of the driving pulse as a function of such time.

18 Claims, 5 Drawing Sheets

METHOD AND ARRANGEMENT FOR CONTROLLING A STEPPING MOTOR

An object of this invention is to provide a method for controlling a stepping motor comprising a winding and a rotor magnetically coupled to said winding, said method including the application to said winding of a driving pulse, each time that said rotor is to turn through a step.

Another object of this invention is to provide a control arrangement applying this method.

BACKGROUND OF THE INVENTION

There exist numerous methods intended to lower the consumption of a stepping motor by adjusting the quantity of electrical energy furnished to the motor during a driving pulse to the resistant torque which the rotor must overcome. Since such torque cannot be directly measured, these methods in fact adjust such quantity of electrical energy as a function of the measurement or the calculation of a value of a physical characteristic, the variation of which depends more or less directly from said torque as a function of time.

The determination of the resistant torque applied to the rotor during a driving pulse may be made following the end of said pulse as for instance in the U.S. Pat. No. 4,212,156. In this patent the variation of current induced in the motor winding by the oscillations of the rotor at the end of the driving pulse is taken as a measurement of this torque and the duration of the following driving pulses is modified, if necessary, as a function of the result of such measurement.

The determination of the resistant torque applied to the rotor may likewise be made during each driving pulse as for instance in the European patent application EP-A-0.060.806. In this application, it is the rate of variation of the voltage induced in the motor winding through the rotation of the rotor which is taken as a measurement of the torque.

These methods as well as numerous others not described herein all present the difficulty that the physical characteristic which they employ as a measurement of the resistant torque, is not truly representative of such torque.

There results therefrom that the control of a stepping motor according to any of these known methods cannot in a practical sense be optimum. This means that if the arrangement applying the chosen method is arranged in a manner such that the motor operates correctly in all possible situations, the consumption of such motor will generally be clearly greater than its theoretic minimum consumption. Should one attempt to modify the characteristics of the control circuit in a manner such that the consumption of the motor diminishes so as to approach its theoretical minimum, then the reliability of operation of such motor diminishes, i.e. its rotor no longer turns correctly responsive to each driving pulse.

Sometimes it is necessary to apply to a stepping motor a driving pulse such as to bring about with certainty the rotation of the rotor, even if the resistant couple applied to the latter is at its maximum value.

This case is shown in particular when the motor is controlled according to a method such as that described in the U.S. Pat. No. 4,272,837 for example.

Such a method consists in particular in applying to the motor a long duration pulse referred to as a catch-up pulse when a suitable circuit has detected that the rotor has not turned in response to a normal driving pulse of short duration.

The duration of the catch-up pulse is evidently determined in a manner such that it brings about rotation of the rotor even if the resistant torque applied thereto is at its maximum value.

However, it may happen that the case of failure by the rotor to rotate in response to a normal driving pulse is only momentary and that the torque applied to the rotor during the following catch-up pulse is small. In such a case the quantity of electrical energy provided to the motor during this catch-up pulse is much too high and it is possible that the rotor of the motor makes several steps instead of one only in response to such catch-up pulse.

The detection of the rotation or non-rotation of the rotor which is necessary in the control methods which have just been mentioned may be accomplished in various manners.

Thus, for instance, in the method described in the U.S. Pat. No. 4,272,837 mentioned hereinabove this detection is obtained by applying to the stepping motor a detection pulse of very short duration a certain time following the end of each driving pulse. The amplitude of current which circulates in the motor winding at the end of this detection pulse enables one to determine whether the rotor has turned or not in response to the preceding driving pulse.

The difference between the currents circulating in the winding in the one and the other case, rotation or nonrotation of the rotor, is however small, thus rendering difficult certain detection of non-rotation. Furthermore, the current measurement may be distorted if the rotor is moving when the detection pulse is applied to the motor, either because the rotor has not yet finished oscillating about its equilibrium position or, because it has been put into motion for instance by a shock.

There exist other methods enabling detection of whether the rotor of the stepping motor has turned or not in response to a driving pulse. These methods will not be described here otherwise than to point out that generally they present the same difficulties as the method described hereinabove.

The purpose of the present invention is to provide a control method for a stepping motor which avoids the difficulties of the methods described hereinabove and which enables according to the manner in which it is applied, to reduce the consumption of the stepping motor almost to its absolute minimum or to cause the rotor of the motor to turn through one and only one step with a large measure of reliability and this whatever may be the resistant torque applied to this rotor or to enable certain detection of rotation or non-rotation of the rotor in response to a driving pulse.

A further purpose of this invention is to provide an arrangement for applying this method.

SUMMARY OF THE INVENTION

The first of these purposes is attained by employing a method of controlling a stepping motor comprising a winding and a rotor magnetically coupled to said winding said method including:

applying a driving pulse to said winding each time that said rotor is to advance through a step;

measuring the quantity of electrical energy converted into mechanical energy from the beginning of said driving pulse;

comparing said quantity of electrical energy with a reference value of energy; and interrupting said driving pulse as a function of said comparison.

The second of these purposes is attained through an arrangement for applying the method as set forth in claim 1 comprising means for producing said driving pulse and further including means for producing a signal indicative of the quantity of electrical energy converted into mechanical energy by said motor from the beginning of said driving pulse, means responsive to said indicating signal for producing a comparison signal between said quantity of electrical energy and a reference value of energy and means for producing an interruption signal for said driving pulse as a function of said comparison signal.

The invention will be described hereinafter with reference to the accompanying drawings.

DESCRIPTION OF THE PREFERRED EMBODIMENT

Figure 1:
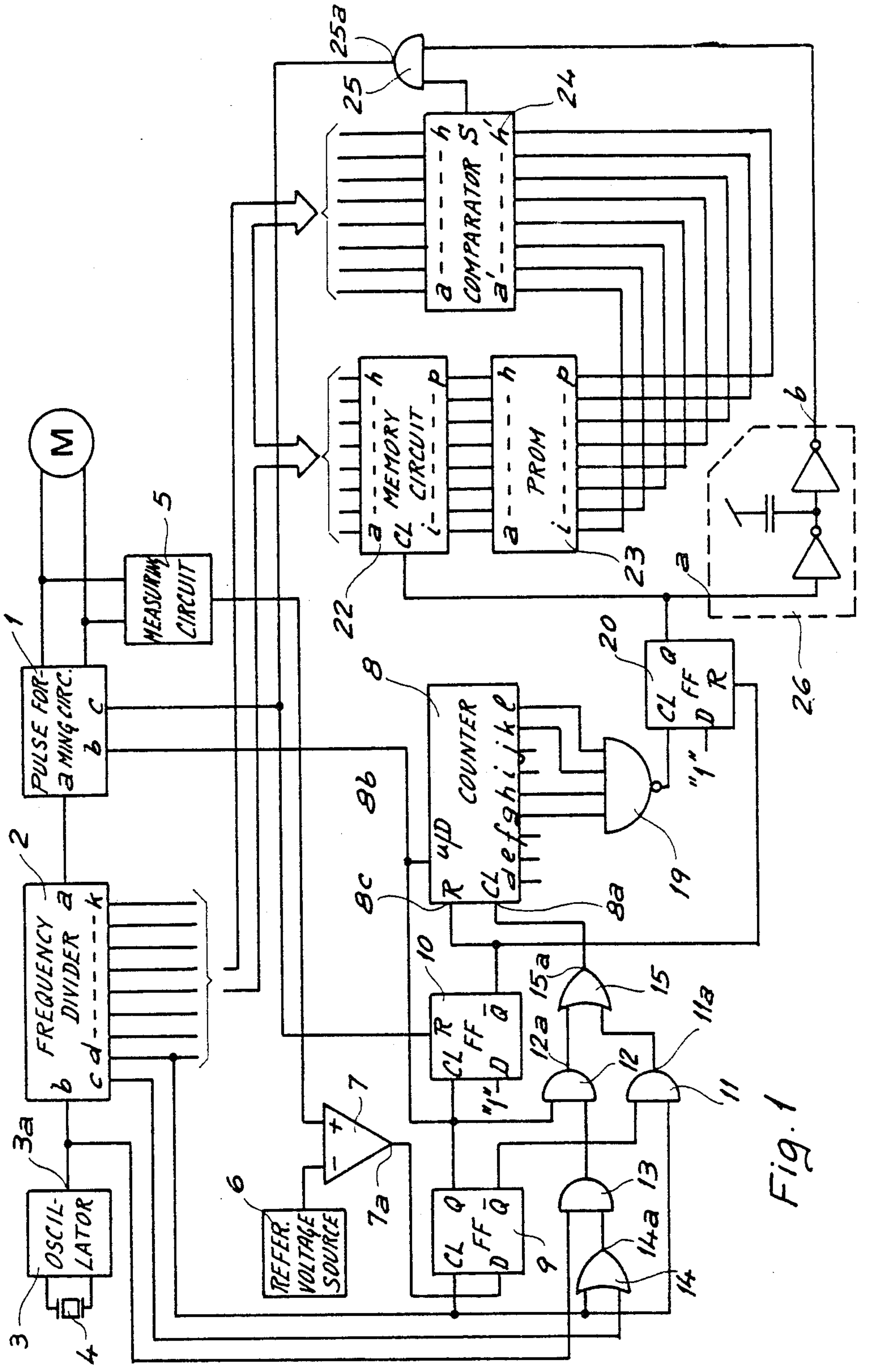
FIG. 1 shows the schematic of a circuit which applies the method according to the invention in order to adjust the duration of the driving pulses as a function of the resistant torque applied to the rotor of the motor.

In a general manner, it is known that the rotor of a stepping motor is permanently subjected to a resistant couple $T_r$ which opposes rotation of such rotor.

The resistant torque $T_r$ is produced by the friction couples of the rotor itself and of the mechanical elements which it drives in their bearings and between them by the Foucault currents and the hysteresis phenomena which are produced in the stator of the motor by the variations of the magnetic field which traverses this stator and by the positioning torque of the rotor to the extent that this rotor has not overshot the angular position of unstable equilibrium where the positioning torque becomes a motor torque.

This resistant couple $T_r$ is thus variable as a function of time in a random manner and it may take on any value whatsoever between a minimum value $Tr_{min}$ and a maximum value $Tr_{max}$ which both depend from the motor characteristics and the mechanical elements which it drives and which may be determined analytically or through trials.

To each value of this resistant torque $T_r$ corresponds a quantity of mechanical energy Emm which is that which the motor must provide as a minimum in order that its rotor turn through a step. In particular, to the values $Tr_{min}$ and $Tr_{max}$ of this resistant torque correspond respectively the values $Emm_{min}$ and $Emm_{max}$ of this quantity of energy. This resistant torque $T_r$ and this quantity of energy Emm are related by a mathematical expression which will not be given here since it is well known to specialists and moreover has no direct connection with the invention.

On the other hand, it is likewise known that the electrical energy $Ep_{0x}$ provided by the energy source of the motor between the beginning of a driving pulse situated at an instant $t_0$ and any subsequent instant $t_x$ satisfies the following equation:

$$Ep_{0x}=Eme_{0x}+Ej_{0x}+Ema_{0x} \quad (1)$$

in which:

$Eme_{0x}$ is the portion of the electrical energy $Ep_{0x}$ which has been converted into mechanical energy by the motor and transmitted by the latter to the load which it drives between the instant $t_0$ and $t_x$;

$Ej_{0x}$ is the portion of this energy $Ep_{0x}$ which has been dissipated by the Joule effect in the motor winding and in its control circuit between these instants $t_0$ and $t_x$; and $Ema_{0x}$ is the portion of the energy $Ep_{0x}$ which has been employed for creating the magnetic energy present in the motor at the instant $t_x$.

It should be noted that, as hereinabove, the indices eventually affecting the symbols for the various energies mentioned in the rest of this description will always be formed by two characters which are respectively identical to the indices affecting the symbols of the instants between which the energy considered is produced or dissipated.

During a driving pulse beginning at an instant $t_0$ and ending at an instant $t_n$, the electrical energy $Eme_{0n}$ converted into mechanical energy by the motor is employed to overcome the resistant torque Tr mentioned hereinabove and to furnish to the various mechanical elements driven by the toror and to the rotor itself their kinetic energy.

After the end of the driving pulse, the energy source for the motor no longer provides electrical energy.

If the quantity of energy $Eme_{0n}$ has been equal to the quantity of energy Emm corresponding to the torque Tr applied to the rotor during this driving pulse, the rotor will complete its step after the end of the driving pulse in response to mechanical energy coming from the reconversion of the kinetic energy of the various moving elements, from the positioning torque of the rotor when such couple is a motor torque, and, if the winding is short-circuited from the end of the driving pulse from the reconversion of a portion of the magnetic energy Ema stored in the motor at the instant $t_n$. The remainder of this magnetic energy Ema is dissipated by the Joule effect in the motor winding. In this case the duration of the driving pulse has been optimum and the consumption of the motor minimum. This optimum duration of the driving pulse will be referred to as $\tau$ in the remainder of this description.

If the quantity of energy $Eme_{0n}$ has been greater than the quantity of energy Emm, that is to say, if the duration of the driving pulse has been greater than the optimum duration $\tau$, the rotor overshoots its final position and effects one or several oscillations around the latter. During these oscillations, the difference between the quantities of energy $Eme_{0n}$ and Emm is converted into thermal energy by the Joule effect in the motor winding and by the various types of friction mentioned hereinabove. If such difference is substantial, the rotor may even effect more than one step in response to this quantity of energy $Eme_{0n}$.

If the quantity of energy $Eme_{0n}$ has been less than the quantity of energy Emm, the rotor will not complete its step and will return to its starting position in response to its positioning torque or in certain cases remain blocked in an intermediate position.

If one wishes to control the motor in a manner such that its rotor is certain to step in response to a driving pulse even if the resistant couple Tr is of maximum value $Tr_{max}$, it is seen that it is sufficient to measure uninterruptedly the quantity of energy Eme which the motor converts into mechanical energy and to interrupt the driving pulse when this quantity of energy Eme becomes equal to the quantity of energy $Emm_{max}$ corresponding to this maximum resistant torque $Tr_{max}$.

On the other hand, controlling the motor by interrupting the driving pulse as soon as the quantity of energy converted during this driving pulse reaches a reference value does not result in minimizing the energy consumption of the motor. Effectively, the latter reference value in such a situation would have to be chosen equal to the quantity of energy $Emm_{max}$ referenced above. Otherwise, the rotor would not perform its step each time the quantity of energy (corresponding to the actual resisting torque which must be overcome during a driving pulse) is greater than the chosen reference value. However, choosing the quantity of energy $Emm_{max}$ as the reference value means that during most of the driving pulses the quantity of energy Eme actually converted by the motor into mechanical energy, and also the quantity of electrical energy Ep consumed by the motor, are much more than needed.

Theoretical considerations which will not be reproduced here and which have been checked and confirmed by practical trials have shown that on the contrary, the variation in time of the quantity of electrical energy Eme converted into mechanical energy by the motor is directly dependent from the resistant torque Tr.

More precisely, the increase in the energy Eme becomes that much more rapid when the torque Tr is small.

Consequently, the time T required for this energy Eme to attain a predetermined reference value is a very good measure of the resistant torque Tr.

It has moreover been determined that the optimum duration $\tau$ of the driving pulse depends directly from the time T mentioned hereinabove. This optimum duration $\tau$ as may be well understood is equal or greater than the time T and the relation which unites it to time T may be determined analytically through knowledge of the motor characteristics and of the load which it drives, or by trials.

The measurement of the time T thus enables one with the assistance of this relationship, to determine the optimum duration $\tau$ of the driving pulse.

The same principle may be employed in order to determine whether the rotor of the motor has stepped correctly or not in response to a driving pulse. Effectively, if the quantity of energy Eme converted by the motor attains a predetermined value before a time likewise predetermined has elapsed, this signifies that the rotor has correctly stepped. If this quantity of energy Eme does not attain such predetermined value in this time, such signifies that the rotor has not stepped.

It is seen that the measurement of the quantity of electrical energy Eme converted into mechanical energy by the motor may serve as a basis in a manner which will be set forth in detail further on, to control effectively the motor in all the above mentioned cases.

From the equation (1) hereinabove, one may readily conclude that:

$$Eme_{0x} = Ep_{0x} - Ej_{0x} - Ema_{0x} \tag{2}$$

It is known furthermore that:

$$Ep_{0x} = \int_{t_0}^{t_x} U \cdot i_s(t) \cdot dt \tag{3}$$

$$Ej_{0x} = \int_{t_0}^{t_x} R \cdot i_m(t)^2 \cdot dt \tag{4}$$

$$Ema_{0x} = \int_{t_0}^{t_x} L \cdot i_m(t) \cdot \frac{di_m}{dt} \cdot dt \tag{5}$$

in which:

U is the voltage of the energy source of the motor;

$i_s(t)$ is the current provided by this source;

$i_m(t)$ is the current circulating in the winding of the motor; and

R and L are respectively the resistance and the inductance of the motor winding.

The equation (2) hereinabove may thus be expressed:

$$Eme_{0x} = \int_{t_0}^{t_x} U \cdot i_s(t) \cdot dt - \int_{t_0}^{t_x} R \cdot i_m(t)^2 \cdot dt - \int_{t_0}^{t_x} L \cdot i_m(t) \cdot \frac{di_m}{dt} \cdot dt \tag{6}$$

It is possible to conceive an electronic circuit capable of furnishing a signal representative of the quantity of energy $Eme_{0x}$.

This circuit may for instance include means for producing signals proportional to currents $i_s$ and $i_m$ as well as analog or digital circuits enabling realization of the various operations of equation (6). This circuit has not been shown since its realization runs directly from equation (6).

Figure 2:
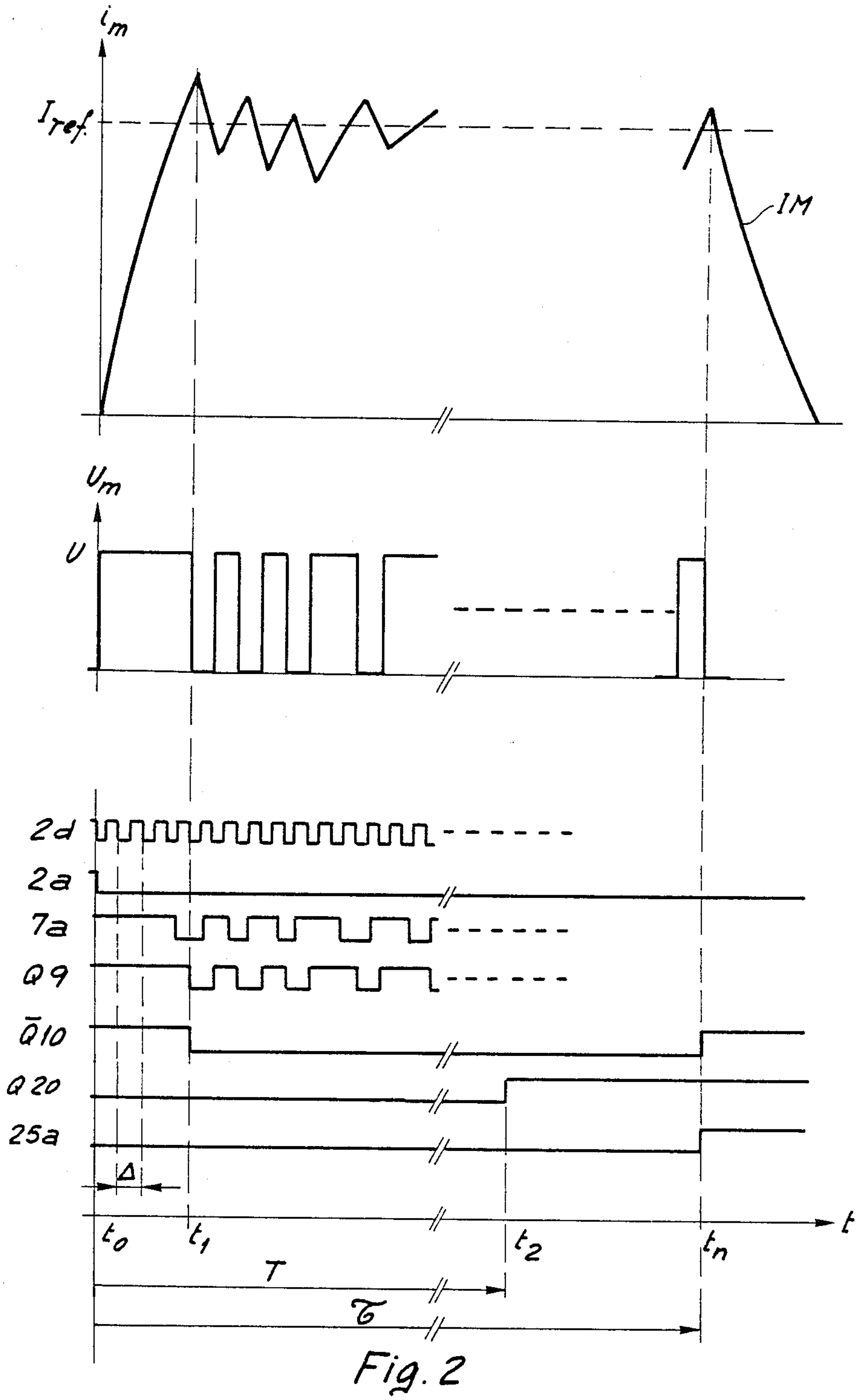
FIG. 2 is a diagram illustrating the operation of a portion of the circuit of FIG. 1.

FIG. 1 shows in particular a schematic of a circuit example enabling likewise to provide a signal representative of the quantity of energy $Eme_{0x}$, in a special case where the stepping motor is controlled in a manner such that the current which passes through its winding is substantially constant and equal to a reference current $I_{ref}$ (see FIG. 2).

In the case illustrated by FIG. 1, the motor designated M is energized by a driving pulse forming circuit 1 which will not be described here in detail since it can be similar to a circuit having the same function and which has been described in the European patent application EP-A-0 057 663.

This pulse forming circuit 1 is arranged in a manner to release a driving pulse IM at each instant, designated by $t_0$ as hereinabove, when the rotor of the motor M is to turn through a step, in response to passage from the logic state "1" to the logic state "0" of a control signal which it receives on its input *1a*.

In this example, the control signal is formed by periodic pulses having a frequency of 1 Hz which are provided by an output *2a* of a frequency divider 2 of which the input *2b* is coupled to the output *3a* of an oscillator 3 controlled by a quartz 4. It is evident that in other applications the control signal applied to the input of the pulse former 1 may be non-periodic.

The output signal from oscillator 3 has a frequency of 32,768 Hz. In addition to its output *2a*, divider 2 includes intermediate outputs *2c* to *2k* providing signals having respectively frequencies of 16,384 Hz, 8,192 Hz, 4,096 Hz, 2,048 Hz, 1,024 Hz, 512 Hz, 256 Hz, 128 Hz and 64 Hz.

Circuits 2 and 3 will not be described here in detail since they are standard and well known to those skilled in the art.

The pulse forming circuit 1 is arranged in a manner to torque at each instant $t_0$ the winding of motor M to an electrical energy source not shown. From this instant $t_0$, the voltage $U_m$ at the terminals of the motor winding is thus equal to the voltage U of such energy source.

The current $i_m$ which starts to circulate in the winding at instant $t_0$ (see FIG. 2) is measured by a measuring circuit 5 which provides a voltage proportional to this current $i_m$. This measuring circuit 5 likewise will not be further described here since it may be similar to a circuit having the same function and which is described in the European patent application EP-A-0 057 663 already cited.

The circuit of FIG. 1 includes additionally a source 6 which provides a voltage proportional to the reference current $I_{ref}$ mentioned hereinabove.

The proportionality relationships between the current $i_m$ and the voltage produced by the circuit 5 on the one hand and between the current $I_{ref}$ and the voltage produced by source 6 on the other hand, are identical.

The voltages produced by circuit 5 and by source 6 are applied to an analog comparator 7 of known type. From the fact that these proportionality relationships mentioned hereinabove are equal, it may be said that the comparator 7 compares current $i_m$ to current $I_{ref}$.

The comparator 7 provides at its output *7a* a signal which assumes the "1" logic state when the current $i_m$ is less than the current $I_{ref}$ and the logic state "0" in the inverse case.

The output *7a* of comparator 7 is coupled to the input D of a D flip-flop 9, the clock input CL of which receives the signal having a frequency of 8,192 Hz provided by the output *2d* of the divider circuit 2 and which, for a reason which will become evident further on, will be referred to as the sampling signal. The instants when this sampling signal changes from the logic state "1" to the logic state "0" will be referred to as sampling instants.

In a well-known manner, the output Q of flip-flop 9 assumes the same state as its input D at each change over of its input CL from the logic state "1" to the logic state "0". The same is true for the other D flip-flops which will be mentioned hereinafter.

Just after the instant $t_0$, the current $i_m$ is less than the current $I_{ref}$. The output *7a* of comparator 7 and the output Q of flip-flop 9 are thus at the state "1".

When the current $i_m$ becomes greater than current $I_{ref}$, the output *7a* of comparator 7 changes to the logic state "0".

At the first sampling instant following such change over of the output *7a* of comparator 7 to the state "0" which is designated by reference $t_1$, the output Q of flip-flop 9 likewise changes to the state "0".

Circuit 1 an input *1b* of which is coupled to the output Q of the flip-flop 9 is arranged in a manner to respond to this state "0" at the output Q of flip-flop 9 by disconnecting the motor winding from the energy source and short-circuiting the winding.

Starting from the instant $t_1$, the voltage $U_m$ at the terminals of the motor winding is thus zero and the current $i_m$ begins to diminish. When it becomes less than current $I_{ref}$, the output *7a* of comparator 7 returns to the state "1". At the following sampling instant the output Q of flip-flop 9 likewise changes over to the state "1". In response to the latter state "1", the circuit 1 terminates the shortcircuiting of the motor winding and once again couples such winding to the energy source. The current $i_m$ thus once again begins to increase and the process described hereinabove recommences up until the instant designated $t_n$ on FIG. 2 when the circuit 1 receives on its input *1c* a signal which interrupts the driving pulse.

This interruption signal arises from the passage from the logic state "0" to the logic state "1" of the output of a circuit which will subsequently be described, such output as is well understood being coupled to the input *1c* of pulse former 1.

In response to this interruption signal, circuit 1 disconnects the winding of the motor from the energy source and short-circuits such winding in a permanent manner until the following instant $t_0$ when the entire process described hereinabove recommences.

It should be noted that in reality the period $\Delta$ of the sampling signal is short relative to the rise or fall time of the current in the winding. These results therefrom that the amplitude of overshooting of $i_m$ on either side of $I_{ref}$ is small and one may consider that $i_m$ is constant and equal to $I_{ref}$ between the instants $t_1$ and $t_n$. There results likewise that the periods of the sampling signal are much more numerous than has been shown on FIG. 2 during each of the periods when the current in the winding increases or decreases.

For each instant $t_x$ following the instant $t_1$ when the current $i_m$ is interrupted for the first time, the terms of equation (2) hereinabove may be written:

$$Eme_{0x} = Eme_{01} + Eme_{1x}$$

$$Ep_{0x} = Ep_{01} + Ep_{1x}$$

$$Ej_{0x} = Ej_{01} + Ej_{1x}$$

and $$Ema_{0x} = Ema_{01} + Ema_{1x}.$$

At the instant $t_1$ the rotor has for practical purposes not yet turned and the motor has yet to furnish any mechanical energy. One thus has:

$$Eme_{01} = 0.$$

Taking into account this fact, it is easily seen that equation (2) hereinabove may be written:

$$Eme_{0x}=Eme_{1x}=Ep_{1x}-Ej_{1x}-Ema_{1x} \quad (7).$$

In a manner analogous to that which has been set forth hereinabove for the terms of equation (2), one may write the terms of equation (7) in the following manner:

$$Ep_{1x}=\int_{t_1}^{t_x} U\cdot i_s(t)\cdot dt \quad (3')$$

$$Ej_{1x}=\int_{t_1}^{t_x} R\cdot[i_m(t)]^2\cdot dt \quad (4')$$

$$Ema_{1x}=\int_{t_1}^{t_x} L\cdot i_m(t)\cdot\frac{di_m}{dt}\cdot dt \quad (5')$$

in which the symbols have the same significance as in equations (3), (4) and (5).

From equation (5') hereinabove, it is easily concluded that $$Ema_{1x}=\tfrac{1}{2}\cdot L\cdot[i_m(x)]^2-\tfrac{1}{2}\cdot L\cdot[i_m(1)]^2$$

in which $i_m(x)$ and $i_m(1)$ are respectively the currents circulating in the winding at the instants $t_x$ and $t_1$ But, as has been seen hereinabove, current $i_m$ is practically constant and equal to $I_{ref}$ between the instants $t_1$ and $t_n$. If the instant $t_x$ considered is situated before such instant $t_n$, it is seen that $i_m(x)=i_m(1)$ and that $Ema_{1x}=0$.

The equation (7) hereinabove may thus be written in this particular case:

$$Eme_{0x}=\int_{t_1}^{t_x} U\cdot i_s(t)dt-\int_{t_1}^{t_x} R\cdot I_{ref}^2\cdot dt \quad (8)$$

or yet:

$$Eme_{0x}=U\cdot\int_{t_1}^{t_x} i_s(t)dt-R\cdot I_{ref}^2\int_{t_1}^{t_x} dt$$

During each driving pulse the motor winding is coupled to the energy source over a certain number of periods of the sampling signal each having a duration Δ. In the remainder of this description, the number of these periods comprised between instant $t_1$ when the current in the winding is interrupted for the first time and the considered instant $t_x$ will be referred to as $C1_x$.

During each of these $C1_x$ periods, the current $i_s$ furnished by the source is equal to the current $i_m$ circulating in the winding which itself is practically equal to the reference current $I_{ref}$.

During the other periods of the sampling signal situated between the instant $t_1$ and the instant $t_x$, the motor winding is disconnected from the energy source. The current $i_s$ is thus zero during these other periods.

There results therefrom that one may write:

$$U\cdot\int_{t_1}^{t_x} i_s(t)\cdot dt=U\cdot I_{ref}\cdot\Delta\cdot C1_x$$

Moreover, if the total number of periods of the sampling signal situated between the instants $t_1$ and $t_x$ is designated $C2_x$, it is seen that $$R\cdot I_{ref}^2\cdot\int_{t_1}^{t_x} dt=R\cdot I_{ref}^2\cdot\Delta\cdot C2_x$$

The equation (8) hereinabove may thus be written:

$$Eme_{0x}=U\cdot I_{ref}\cdot\Delta\cdot C1_x-R\cdot I_{ref}^2\cdot\Delta\cdot C2_x \quad (9)$$

or yet:

$$Eme_{0x}=k\cdot(p\cdot C1_x-C2_x) \quad (10)$$

with $k=R\cdot I_{ref}^2\cdot\Delta$ and $p=\frac{U}{R\cdot I_{ref}}$

Factors k and p being constants, there results from equation (10) that in the present case where the current circulating in the winding is practically constant and equal to $I_{ref}$, the quantity of electrical energy $Eme_{0x}$ converted into mechanical energy by the motor between the beginning of a driving pulse and any instant whatsoever $t_x$ is proportional to the difference between the product of the number $C1_x$ by factor p on the one hand and the number $C2_x$ on the other hand.

It should be noted that equation (9) hereinabove may likewise be written:

$$Eme_{0x}=k'\cdot\left(C1_x-\frac{1}{p}\cdot C2_x\right) \quad (11)$$

with $k'=U\cdot I_{ref}\cdot\Delta$ and $p=\frac{U}{R\cdot I_{ref}}$ as in equation (10).

Consequently, the quantity of energy $Eme_{0x}$ is likewise proportional to the difference between the number $C1_x$ on the one hand and the quotient of the number $C2_x$ divided by factor p on the other hand.

In order that the value of $Eme_{0x}$ given by one or the other of the equations (10) or (11) hereinabove be exact, it is evidently necessary that the instant $t_x$ under consideration may not be any instant whatsoever but that it coincide with one of the sampling instants. But since the frequency of the sampling signal is relatively high, the error arising when the instant $t_x$ under consideration does not coincide with a sampling instant, is small.

In the case where the factor p which multiplies number $C1_x$ in equation (10) hereinabove is an integer, the calculation of the term between parentheses in equation (10) may be obtained quite readily. It is seen that it suffices for instance to increment a reversible counter by p units during each of the periods of the sampling signal when the motor winding is coupled to the energy source and to decrement such counter by one unit at every sampling instant whether the winding be coupled to the energy source or not. The contents $N_x$ of this counter will thus permanently be equal to $p\cdot C1_x-C2_x$, and thus proportional to the quantity of energy $Eme_{0x}$.

At the sampling instants when the winding is coupled to the energy source, it is necessary to increment the counter by p units and, simultaneously, to decrease it by one unit. In order to avoid the problems which may arise from the fact of this simultaneous operation, one may simply increment the counter by $(p-1)$ units at each sampling instant when the motor winding is coupled to the energy source and not decrement the counter by a unit except at the sampling instants when the motor winding is disconnected from the energy source.

Under these conditions, the contents $N_x$ of the counter are permanently equal to $$(p-1)C1_x-(C2_x-C1_x) \quad (12)$$

It is easily seen that this expression (12) is equal to the term between parentheses of equation (10) hereinabove.

The same principle may be employed for the case where the factor p mentioned hereinabove is not an integer.

In these cases it is sufficient for instance to increment the counter by $n\cdot(p-1)$ units during the periods of the sampling signal when the motor winding is coupled to the energy source n being an integer such that $n\cdot(p-1)$ is likewise an integer and to decrement the counter by n units when the motor winding is disconnected from the source. Under these conditions the contents of the counter are permanently equal to:

$$n\cdot(p-1)\cdot C1_x-n\cdot(C2_x-C1_x) \quad (13)$$

It is easily seen that expression (13) is equal to n times the term between parentheses of equation (10) hereinabove and that it is thus likewise proportional to the quantity of energy $Eme_{0x}$.

FIG. 1 likewise shows the schematic of an example of a circuit enabling calculation of expression (12) in a case where the factor p defined hereinabove is equal to 4. In this case, the reversible counter mentioned hereinabove must thus be incremented by three units at each sampling instant when the motor winding is connected to the energy source and decremented by one unit at each sampling instant when this winding is disconnected from such source and short-circuited.

The reversible counter is designated by reference 8 on FIG. 1. Its clock input 8*a* is coupled to the output of a logic circuit formed by AND-gates 11 to 13 and OR-gates 14 and 15 which are coupled among themselves with the outputs Q and $\overline{Q}$ of flip-flop 9, with the output of oscillator 3 and with the outputs 2*c* and 2*d* of the frequency divider 2 in the manner shown.

The counting sense control input 8*b* of counter 8 is coupled to the output Q of flip-flop 9 and its reset input 8*c* is coupled to the output $\overline{Q}$ of a D flip-flop 10.

The clock input CL of flip-flop 10 is coupled to the output Q of flip-flop 9, its D input being permanently coupled to the voltage corresponding to the logic state "1" and its reset input R being coupled to the output of the circuit already mentioned which produces the interruption signal for the driving pulse in the form of a passage from the logic state "0" to the logic state "1" and which will be described subsequently.

At the end of each driving pulse, the output $\overline{Q}$ of flip-flop 10 is thus placed in the state "1". It is easy to see that this output $\overline{Q}$ of flip-flop 10 is still in this state "1" at instant $t_0$ which marks the beginning of the following driving pulse and that it remains in this state until the instant $t_1$ following such instant $t_0$.

Between the end of a driving pulse and the instant $t_1$ situated after the beginning of the following driving pulse, the reset input R of counter 8 is thus at the state "1" and the contents of this counter are equal to zero.

It is necessary to observe that in a general manner the contents of counter 8 comprise a number which is represented in binary form by the state "0" or "1" of outputs 8*d* to 8*l*. The lowest weighted digit of this number is shown by the logic state of the output 8*d* and the highest weighted digit is shown by the state of output 8*l*.

It has been seen hereinabove that following each instant $t_0$ the output Q of flip-flop 9 goes to the state "0" at the instant $t_1$ which is the sampling instant following the instant when the current $i_m$ exceeds for the first time the reference current $I_{ref}$.

At this instant $t_1$, the output $\overline{Q}$ of flip-flop 10 thus goes to the state "0" in response to this passage to the state "0" of the output Q of flip-flop 9.

Figure 6:
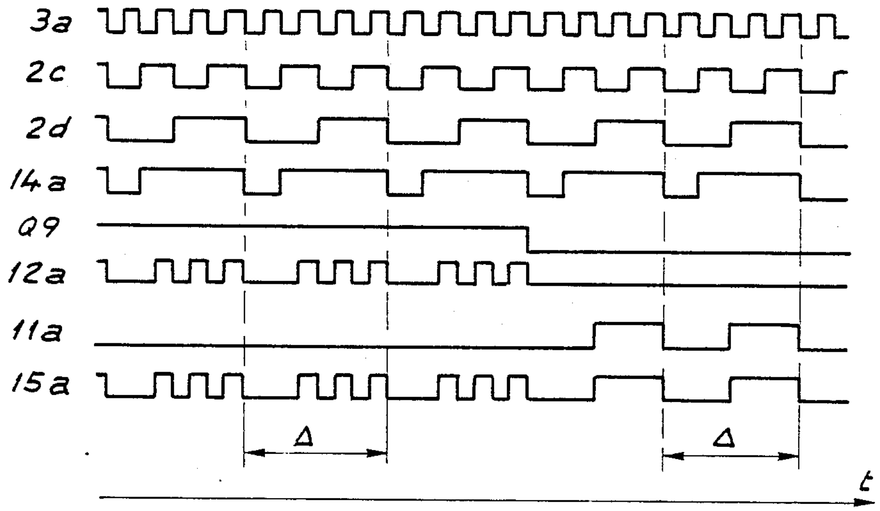
FIG. 6 is a diagram illustrating the operation of another portion of the circuit of FIG. 1.

It is easy to see with the help of the diagrams of FIG. 6, that during each period of the sampling signal the output 15*a* of gate 15 provide three pulses when the output Q of flip-flop 9 is in the "1" state or a single pulse when this output Q of flip-flop 9 is in the zero state.

As long as the reset input R of counter 8 is in the "1" state, pulses produced by the output 15*a* of gate 15 have no effect on counter 8, the contents of which remain at zero.

On the other hand, starting from the instant $t_1$, these pulses increment or decrement counter 8 in accordance with the state of its input 8*b*.

It is easy to see that when output Q of flip-flop 9 is in the state "1", i.e. when the motor winding is coupled to the energy source, counter 8 is incremented by one unit for each of the three pulses produced by the output 15*a* of gate 15 during each period of the sampling signal.

In the same manner, counter 8 is decremented by one unit at each period of the sampling signal when the output Q of flip-flop 9 is in the state "0", i.e. when the motor winding is disconnected from the energy source and short-circuited.

It is thus seen that at any instant whatsoever $t_x$ located after an instant $t_1$ and until the end of each driving pulse, the contents of counter 8 are equal to the number $N_x$ defined by expression (12) hereinabove and that it is thus proportional to the quantity of electrical energy $Eme_{0x}$ which has been converted into mechanical energy by the motor from the beginning of the driving pulse.

The calculation of the quantity of energy $Eme_{0x}$ may likewise be made on the basis of equation (11) hereinabove with the aid of a reversible counter, the contents of which are at all times a number $N'_x$ equal to the term between parentheses of equation (11).

In this case the counter is for instance incremented by one unit at each sampling instant when the winding is coupled to the energy source and continuously decremented at a frequency equal to the ratio between the frequency of the sampling signal and the factor p.

Figure 7:
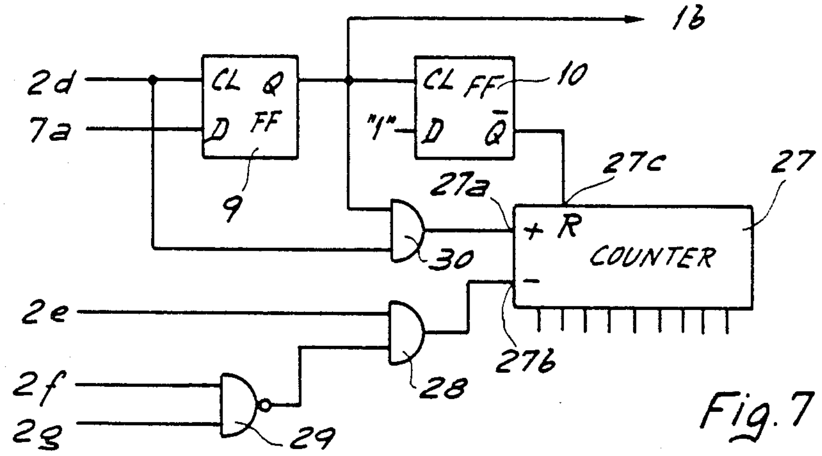
FIG. 7 represents another embodiment of a circuit applying the method according to the invention.

FIG. 7 shows an example of the modifications which may be brought to the circuit of FIG. 1 to transform the latter into a circuit for measuring the quantity of energy $Eme_{0x}$ by means of equation (11) hereinabove in a case where the frequency of the sampling signal is 8,192 Hz as in the example of FIG. 1 and the factor p is equal to 2.67. The frequency of the decrementing signal of the counter mentioned hereinabove is thus theroretically equal to 3,068.2 Hz.

The components 1 to 7 of this circuit are identical to the components of the circuit of FIG. 1 which bear the same references and have not been shown in FIG. 7. Flipflops 9 and 10 of FIG. 7 are identical to those which bear the same references in FIG. 1 and are controlled in the same manner as the latter.

Counter 8 of FIG. 1 is replaced by a reversible counter 27 having an incrementing input *27a*, a decrementing input *27b* and a reset input *27c*.

The incrementing input *27a* of counter 27 is coupled to the output of an AND-gate 30, the inputs of which are respectively coupled to the output Q of flip-flop 9 and the output *2d* of the divider 2 which is the output providing the sampling signal.

The decrementing input *27b* of counter 27 is coupled to the output of an AND-gate 28 the inputs of which are respectively coupled to the output *2e* of divider 2 and to the output of a NAND-gate 29. The inputs of this gate 29 are respectively coupled to the outputs *2f* and *2g* of divider 2.

The reset input *27c* of counter 27 is coupled to the output $\overline{Q}$ of flip-flop 10.

It is seen that as was the case for counter 8 of FIG. 1, the contents of counter 27 are maintained at zero from the end of each driving pulse until the instant $t_1$ which follows the beginning of the following driving pulse.

From this instant $t_1$ the contents of counter 27 are incremented by one unit at each sampling instant when the output $\overline{Q}$ of flip-flop 10 is in the "0" state, i.e. when the motor winding is coupled to the energy source.

Furthermore, and continuing from instant $t_1$, the contents of counter 27 are decremented by the signal produced by the output of gate 28.

Figure 8:
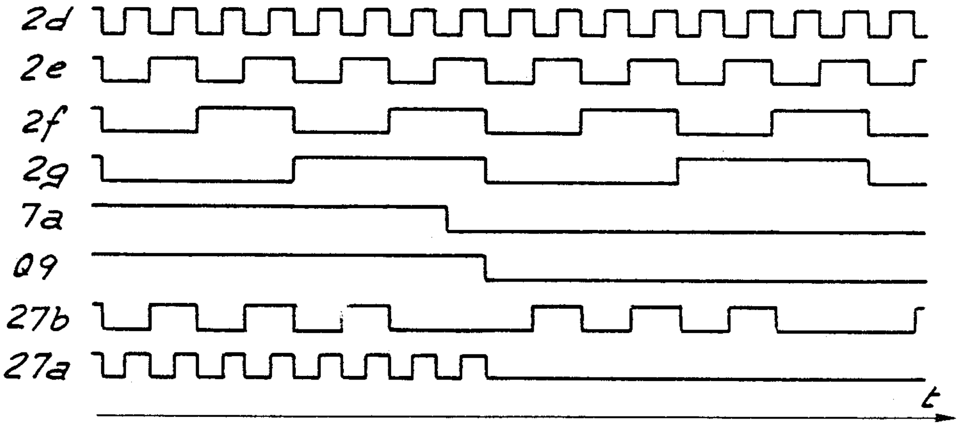
FIG. 8 is a diagram illustrating the operation of the circuit of FIG. 7.

It is easily seen with the help of the diagrams of FIG. 8, that the decrementing signal of counter 27 has an average frequency equal to three quarters of the frequency of the signal furnished by the output *2e* of divider 2, which is to say 3,072 Hz.

It is thus seen that from each instant $t_1$ the contents of counter 27 is a number which is practically permanently equal to the number $N'_x$ defined hereinabove and thus to the term between parentheses of equation (11) hereinabove and that it is thus likewise practically proportional to the quantity of energy $Eme_{0x}$.

The fact that the average frequency of the decrementing signal of counter 27 is equal in this case to 3,072 Hz and not to the theoretical value of 3,068.2 Hz evidently introduces an error in the calculation of the quantity of energy $Eme_{0x}$. In this particular case however this error is sufficiently small to be overlooked.

It is not always easy to produce from the available signals in the circuit a decrementing signal for the counter 27 having a frequency sufficiently close to the theoretical frequency in order that the error in the measurement of the quantity of energy $Eme_{0x}$ be negligible. In such case it is sufficient to modify the value of the current $I_{ref}$ which has been chosen in a manner such that the coefficient p take on a value for which the theoretical frequency of the decrementing signal of counter 27 is equal or at least almost equal to the frequency of a signal which may readily be produced from the available signals.

It has been seen hereinabove that for each value of the resistant torque Tr which opposes rotation of the rotor during a driving pulse, the motor must furnish a quantity of mechanical energy Emm determined in order that its rotor make just one step in response to this driving pulse. In order that the consumption of the motor be minimum, it is thus necessary to interrupt each driving pulse at the instant when the quantity of electrical energy Eme converted into mechanical energy by the motor attains this value Emm.

It has likewise been seen hereinabove that during each driving pulse the time T required for the quantity of energy Eme to attain the value of a predetermined quantity of energy $E_{ref}$ depends from the resistant torque Tr which opposes rotation of the rotor and that there exists a well-defined relationship between such time T and the optimum duration $\tau$ of the driving pulse.

Figure 5:
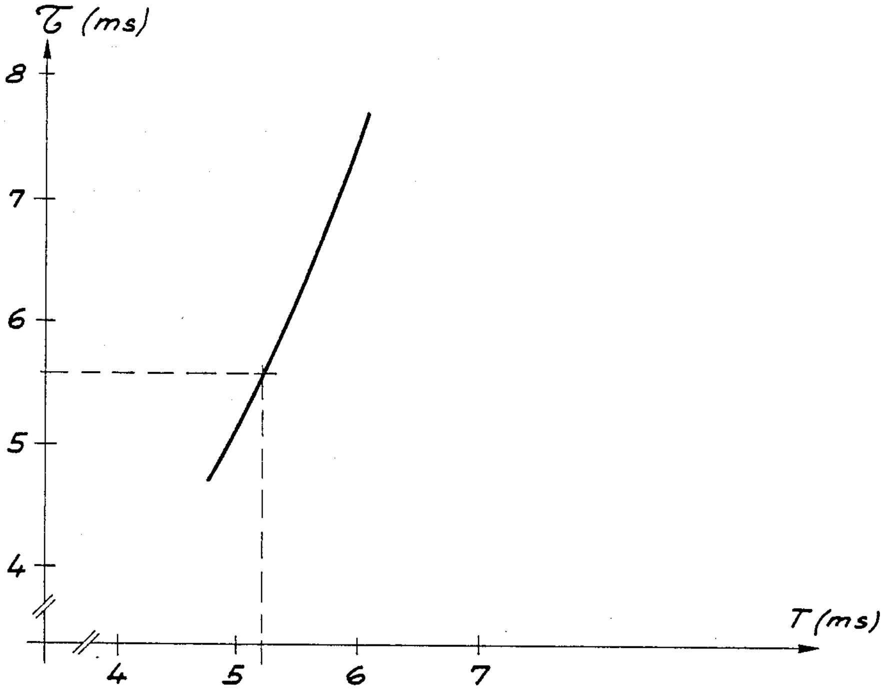
FIG. 5 represents the relationship between the time required by the quantity of energy Eme to attain the reference value $E_{ref}$ and the optimum duration of the driving pulse.

FIG. 5 gives an example of this relationship which evidently depends from the characteristics of the motor and the moving elements which it drives and which may be determined analytically and/or by trials.

In order to determine the optimum duration $\tau$ of a driving pulse it is thus necessary to measure continuously the quantity of electrical energy Eme converted into mechanical energy from the beginning of this driving pulse, measure the duration T of the time lapse which separates the beginning of the driving pulse from the instant designated $t_2$ when this quantity of energy Eme attains the value of the quantity of reference energy $E_{ref}$, determine the optimum duration $\tau$ of the driving pulse corresponding to this duration T and interrupt the driving pulse when its duration becomes equal to the optimum duration $\tau$.

It has been seen hereinabove that in fact the measuring circuit for the quantity of energy Eme of which examples have been described, does not give the real value of this quantity of energy Eme but rather furnishes an analog or digital measurement signal which is proportional thereto. Practically, the duration T mentioned hereinabove is thus that which separates the beginning of the driving pulse from the instant when this measurement signal attains a reference value proportional to the quantity of reference energy $E_{ref}$. The proportionality relationships between the quantity of energy Eme and the value of the measurement signal on the one hand and between the quantity of reference energy $E_{ref}$ and the reference value on the other hand are, as may be well understood, equal.

In the present example where the consumption of the motor must be as small as possible, preferably there will be chosen as quantity of reference energy $E_{ref}$ the quantity of energy $Emm_{min}$ which the motor must provide in order that its rotor make just one step when the resistant torque which it must overcome is at its minimum value $Tr_{min}$.

One could likewise choose for $E_{ref}$ a value less than that of the quantity of energy $Emm_{min}$. On the other hand, it would be injudicious to choose for $E_{ref}$ a value greater than that of the quantity of energy $Emm_{min}$ since the duration of driving pulses would then be greater than the optimum duration each time that the resistant torque Tr would have its minimum value $Tr_{min}$.

The instant $t_2$ defined hereinabove is thus that when the measurement signal produced by the circuit measuring the quantity of energy Eme attains the corresponding value to that quantity of energy $Emm_{min}$.

FIG. 1 likewise represents an example of a circuit enabling measurement of the duration T which separates the beginning of a driving pulse from this instant $t_2$.

One may recall that in FIG. 1 the signal measuring the quantity of electrical energy Eme converted into mechanical energy by the motor from the beginning of a driving pulse is constituted by the contents of counter 8, i.e. by the binary number formed by the logic states "0" or "1" of the outputs of such counter 8.

In the example of FIG. 1, the value of the measurement signal corresponding to the energy $Emm_{min}$ taken as reference is that for which the outputs g, h, k and l of counter 8 are simultaneously at the logic "1" state, the other outputs of counter 8 being at the logic "0" state. The binary number represented by this combination of states has a value expressed in decimal notation of 408.

The circuit enabling measurement of the duration T includes a NAND-gate 19 of which the inputs are each coupled to one of the outputs g, h, k and l of counter 8.

The output of gate 19 is coupled to the clock input CL of a D flip-flop 20 of which the input D is permanently coupled to the potential representing the logic state "1" and of which the reset input R is coupled to the output $\overline{Q}$ of flip-flop 10.

The output Q of flip-flop 20 is coupled to the control input CL of a memory circuit 22 the other inputs of which are coupled to the outputs d to k of divider 2.

The circuit of memory 22 is of a well known type. It is arranged in a manner such that when its control input CL is at the "0" state, it is "transparent", i.e. that the logic state of its outputs i to p is permanently identical to the logic state of its inputs a to h. On the other hand, when its control input CL is at the state "1", its outputs i to p are blocked in the logic state which they had at the instant when this input CL assumed the state "1".

The circuit for measuring the time T, formed from the gate 19, from the flip-flop 20 and from the memory circuit 22 operates in the following manner:

It has been seen hereinabove that between the end of the driving pulse and the instant $t_1$ situated after the beginning of the following driving pulse, the output $\overline{Q}$ of flip-flop 10 is at the state "1". During this time the output Q of flip-flop 20 is thus maintained in the "0" state and the memory circuit 22 is transparent. Furthermore, the contents of counter 8 is maintained at zero.

At the instant $t_0$ which marks the beginning of each driving pulse, all the outputs of divider 2 are at the logic "0" state. Following instant $t_0$, the states of these outputs are regularly modified at the rhythm of the signal produced by the oscillator 3 and these logic states together form a binary number which represents at each instant the duration of time which has run out since the immediately preceding instant $t_0$.

At the instant $t_1$ which follows the beginning of a driving pulse, the output $\overline{Q}$ of flip-flop 10 goes to the state "0" and the contents of counter 8 begin to increase in a manner to represent the quantity of electrical energy Eme converted into mechanical energy by the motor.

When, at the instant $t_2$ the contents of counter 8 attain the reference value mentioned hereinabove, in the present example the value 408, the output of gate 19 goes to the state "0". In response to this passage the output Q of flip-flop 20 goes to the state "1". From this instant $t_2$ the output of the memory circuit 22 thus remains blocked in the state which is that which the outputs d to k of divider 2 had at this instant $t_2$. The binary number formed by the logic state of the outputs i to p of the memory circuit 22 is thus a measurement of the duration T of the time lapse which has occurred between the beginning of the driving pulse and the instant $t_2$ when the quantity of energy Eme has attained the predetermined reference value, in this example the value $Emm_{min}$.

It should be noted that gate 19 operates as a digital comparator, since it produces a signal when the contents of counter 8 become equal to the reference number, in this example 408. It could thus be replaced without difficulty by such a digital comparator of which the first inputs would be coupled to outputs 8*d* to 8*m* of counter 8, and the second inputs would be permanently coupled to the potentials representing the logic states "0" or "1" in a manner such that the combination of these states formed the desired binary number.

FIG. 1 likewise shows an example of a circuit intended to determine the optimum duration $\tau$ of the driving pulse as a function of the duration T measured by the circuit described hereinabove. In this example such circuit includes a simple PROM memory (Programmable Read Only Memory).

The inputs a to h of this PROM 23 are coupled to outputs i to p of the memory circuit 22 and it is programmed so as to materialize the relationship between the time T measured by the circuit which has just been described and the optimum duration $\tau$ of the driving pulse. This signifies that for each binary number formed following each instant $t_2$ by the logic states of the outputs i to p of the memory circuit 22, i.e. for each special value of time T, the outputs i to p of the PROM 23 exhibit logic states forming a second binary number which represents the optimum duration $\tau$ corresponding to this time T.

FIG. 1 likewise represents an example of a circuit enabling interruption of the driving pulse when its duration becomes equal to the optimum duration $\tau$ determined with the help of the PROM 23.

This circuit includes in this example a digital comparator 24 the first inputs a to h of which are coupled to the outputs d to k of divider 2 and the second inputs a′ to h′ of which are coupled to the outputs i to p of the PROM 23. The output s of comparator 24 is normally at the logic "0" state and it assumes the state "1" only if the binary number formed by the logic states of its inputs a to h is equal to the binary number formed by the logic states of these inputs a′ to h′.

This output s of comparator 24 is coupled to a first input of an AND-gate 25 the second input of which is coupled to the output Q of flip-flop 20 via a delay circuit 26 the function of which will be described subsequently. The output 25*a* of gate 25 is coupled to the input 1*c* of the pulse forming circuit 1 and to the reset input R of flip-flop 10.

It has been seen hereinabove that during each driving pulse the outputs i to p of the PROM 23 exhibit, after the instant $t_2$, logic states which form a binary number corresponding to the optimum duration $\tau$ of this driving pulse. Following instant $t_2$, the binary number formed by the logic states of the outputs d to k of divider 2 continues to increase. When this binary number becomes equal to that which is formed by the logic states of the outputs i to p of the PROM 23, which is to say at the instant $t_n$ when the duration of the driving pulse becomes equal to the optimum duration $\tau$, the output s of comparator 24 goes to the state "1". The output of the delay circuit 26 being likewise at the state "1" at this instant, the output 25*a* of gate 25 and thus the input 1*c* of the pulse forming circuit 1 and the reset input R of flip-flop 10 likewise go to the "1" state.

Consequently, the pulse forming circuit 1 interrupts the driving pulse and the contents of counter 8 are reset to zero.

This situation remains unchanged until the following instant $t_0$ when the entire process described hereinabove begins again.

It may happen that just following the instant $t_2$, outputs i to p of PROM 23 assume during a very short time a logic state different from their definite state. The delay circuit 26, which includes in the present example two inverters and a capacitor coupled as shown, is intended to prevent that a "1" state which would eventually appear at the output s of comparator 24 during this time does not bring about premature interruption of the driving pulse.

In sum, it is seen that each driving pulse produced by the circuit of FIG. 1 has a duration which is equal to the optimum duration $\tau$ corresponding to the resistant torque Tr which is effectively applied to the rotor during this driving pulse.

Everything else being equal, the method according to the invention realized by the circuit of FIG. 1 for instance is thus that which permits controlling the motor with electrical energy consumption as small as possible.

This advantage is due to the fact that the physical characteristic which serves as a base for determining the duration of each driving pulse is the quantity of electrical energy converted by the motor into mechanical energy the variation of which as a function of time is directly linked to the value of the resistant torque which the rotor of the motor must overcome during this driving pulse.

In the cases where, as in the case of FIG. 1, the motor is controlled in a manner such that the current $i_m$ traversing the winding during a driving pulse is substantially constant and equal to a value $I_{ref}$ between the instants $t_1$ and $t_n$, the total quantity of electrical energy Ep furnished by the energy source during this driving pulse evidently depends from this value $I_{ref}$.

Figure 3:
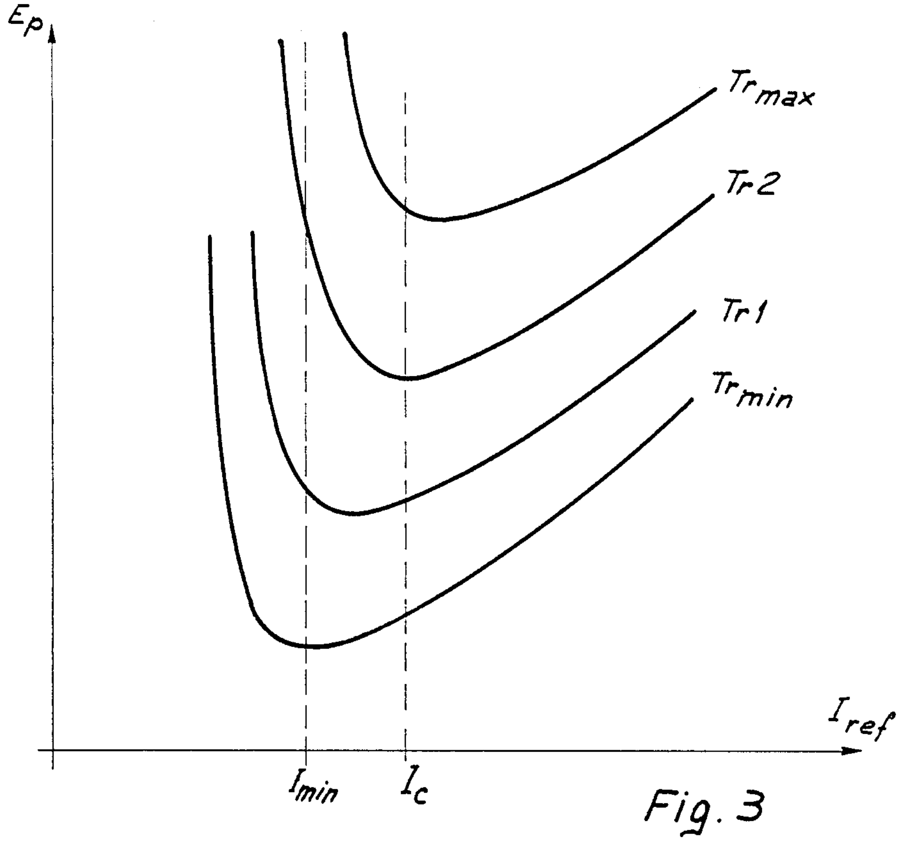
FIG. 3 represents the variation of consumption of a stepping motor controlled by the circuit of FIG. 1 as a function of the reference current for several resistant couples applied to the rotor.

FIG. 3 shows an example of the form of this dependence for four different resistant couples $Tr_{min}$, Tr1, Tr2 and $Tr_{max}$.

It is seen on FIG. 3 that for each value of resistant torque there exists a value $I_{ref}$ for which this quantity of energy Ep is minimum.

FIG. 3 likewise shows that this value $I_{ref}$ for which the quantity of energy Ep is minimum increases with the value of the resistant torque Tr.

Figure 4:
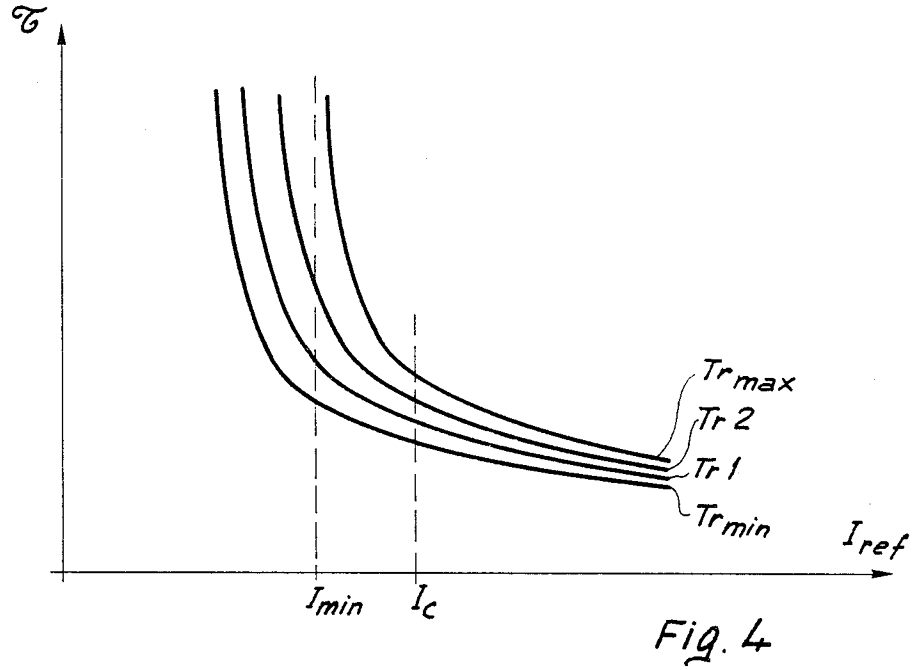
FIG. 4 represents the variation of the optimum duration of the pulse as a function of the reference current for several resistant couples applied to the rotor.

Furthermore, it is seen on FIG. 3 that if one chooses for $I_{ref}$ the value $I_{min}$ corresponding to the minimum quantity of energy Ep which the energy source must provide to the motor when the resistant torque Tr has the value $Tr_{min}$, this quantity of energy Ep increases very rapidly with the increase of the resistant torque Tr. This quantity of energy Ep may even become infinite when the resistant couple Tr approaches its maximum value $Tr_{max}$. This signifies that the motor is no longer capable in this case of converting sufficient electrical energy into mechanical energy to cause the rotor to turn or, in other terms, that the optimum duration $\tau$ of the driving pulse would become infinite as may be seen from FIG. 4.

It is thus judicious to choose for the reference current $I_{ref}$ a value greater than the value $I_{min}$ mentioned hereinabove and less than or equal to the value $I_{max}$ which is that for which the quantity of energy Ep is minimum when the resistant torque Tr has its maximum value $Tr_{max}$. This value $I_{ref}$ is preferably chosen in a manner such that, whatever might be the resistant couple Tr, the quantity of energy Ep effectively furnished by the source is only slightly greater than the minimum quantity of energy Ep corresponding to this torque Tr. The value $I_c$ indicated on FIG. 3 fulfils this condition.

Considerations similar to the foregoing may be applied in the case where the motor is controlled in a manner such that the voltage applied thereto is constant during each driving pulse, i.e. in such a case there exists an optimum value of this voltage for which the quantity of energy Ep furnished by the energy source is minimum.

But this energy source is generally constituted by a battery the voltage of which may not be freely chosen. It would thus be necessary to provide a circuit producing such optimum voltage from the voltage of the energy source. However, such a circuit itself consumes a non-negligible quantity of electrical energy. There results therefrom that overall, the consumption of a motor fed by this optimum voltage is not essentially smaller than the consumption of the same motor directly fed by the voltage of the energy source.

In the examples described hereinbefore, the measurement of the quantity of electrical energy Eme converted into mechanical energy by the motor during a driving pulse is employed to determine the duration of this driving pulse.

This measurement may likewise be employed in order to determine if the rotor turns correctly or not responsive to such driving pulse.

It has been seen in effect hereinabove that the time T required for the quantity of energy Eme to attain the reference value $E_{ref}$ is a measurement of the value of the resistant torque Tr applied to the rotor. When this couple Tr reaches its maximum value $Tr_{max}$, time T thus likewise has a maximum value $T_{max}$ which depends, as may be readily understood, from the characteristics of the motor and the load which it drives.

There results that if for any reason whatsoever the resistant torque Tr applied to the rotor during a driving pulse has a value greater than its maximum value $Tr_{max}$, the quantity of energy Eme does not attain the reference value $E_{ref}$ before time $T_{max}$ has run out.

It is the same if, for any reason whatsoever, the polarity of the driving pulse does not correspond to the angular position which the rotor occupies at the beginning of this driving pulse and that consequently the latter cannot bring about rotation of the rotor, independently of the value of the resistant torque Tr.

It is thus possible to detect if the rotor turns correctly or not responsive to a driving pulse by determining at an instant of detection $t_d$ separated from the beginning of this driving pulse by a duration at least equal to $T_{max}$ if the quantity of energy Eme has attained the reference value or not.

Figure 9:
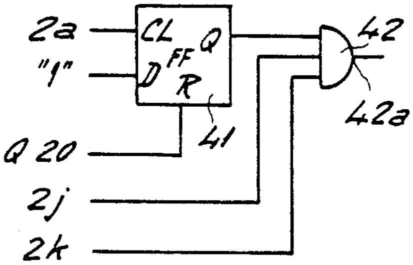
FIG. 9 represents the schematic of a circuit which may be associated with the circuit of FIG. 1 in order to determine whether the rotor of the motor turns correctly or not in response to a driving pulse.

FIG. 9 shows the schematic of an example of a circuit which brings about this detection in a case where the time $T_{max}$ has a duration of about 11 milliseconds.

This circuit includes in such case a D flip-flop 41 and an AND-gate 42.

The clock input CL of flip-flop 41 is coupled to the output 2*a* of the divider 2 of FIG. 1, its input D being permanently coupled to the potential which represents the logic "1" state and its reset input R is coupled to the output Q of the flip-flop 20 of FIG. 1. The inputs of gate 42 are respectively coupled to the output Q of flip-flop 41 and to the outputs 2*j* and 2*k* of the divider 2 on FIG. 1.

Figure 10A:
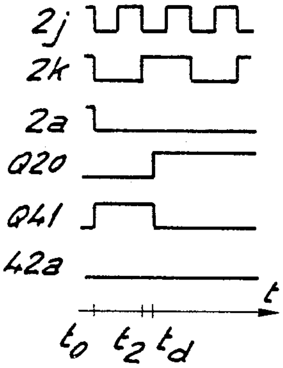
FIGS. 10*a* and 10*b* are diagrams illustrating the operation of the circuit of FIG. 9.
Figure 10B:
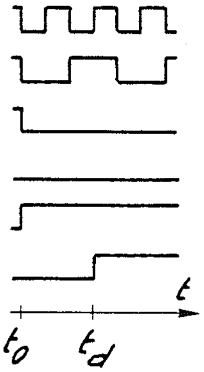

It is easily seen by means of the diagrams of FIGS. 10*a* and 10*b* that the output Q of flip-flop 41 goes to the state "1" at each instant $t_0$. Furthermore, it is seen that following instant $t_0$ one at least of the outputs 2*j* and 2*k* of divider 2 is in the state "0" during a period and a half of the signal produced by the output 2*j* of the divider 2, i.e. during 11.7 milliseconds. In this example the instant located at the end of this period of 11.7 milliseconds, when the signal at 128 Hz produced by the output 2*j* of divider 2 goes to the state "1", is the detection instant $t_d$ mentioned hereinabove. The output 42*a* of gate 42 is thus maintained in the state "0" until this instant $t_d$ independently from the state of the output Q of flip-flop 41.

If the rotor of the motor has correctly turned responsive to a driving pulse beginning at the instant $t_0$, the quantity of energy Eme attains the reference value $E_{ref}$ at an instant $t_2$ situated less than 11 milliseconds following this instant $t_0$, i.e. before the instant $t_d$. At this instant $t_2$, the output Q of flip-flop 20 goes to the "1" state, as has been shown hereinabove, and the output of flip-flop 41 returns thus to state "0" and remains there until the beginning of the following driving pulse. The output 42*a* of gate 42 thus remains likewise in the "0" state. This situation is illustrated by FIG. 10*a*.

If on the other hand the rotor does not turn correctly responsive to a driving pulse, the quantity of energy Eme has not yet attained the reference value $E_{ref}$ at the instant $t_d$. The output Q of flip-flop 20 is thus still in the state "0" and the output Q of flip-flop 41 is still in the state "1". There results therefrom that the output 42*a* of gate 42 goes to state "1" at this instant $t_d$. This state "1" constitutes the detection signal for non-rotation of the rotor. This situation is illustrated by FIG. 10*b*.

A circuit such as that which is shown on FIG. 9 is evidently particularly well adapted to detect the rotation or failure to rotate of the rotor of a motor controlled by driving pulses the duration of which is adjusted depending on the quantity of electrical energy Eme converted into mechanical energy during these driving pulses, since the measuring means for this quantity of energy Eme are already included in the circuit producing the driving pulses.

However, it is necessary to observe that this detection of the rotation or failure to rotate of the rotor may likewise be obtained whatever be the manner by which these driving pulses are generated.

Thus, it is for instance entirely possible to conceive a control circuit of a stepping motor including a pulse former producing driving pulses having a first fixed relatively short duration or a second duration longer than the first according to whether a detection signal indicates that the rotor turns correctly or not responsive to the driving pulses of short duration.

This detection signal could be produced by a circuit including measurement means for the quantity of energy Eme such as those which are formed by elements 5 to 15 of FIG. 1, means for determining the instant when this quantity of energy Eme attains a reference value $E_{ref}$ such as those which are formed by elements 19 and 20 of FIG. 1 and means for detecting the rotation or failure to rotate of the rotor such as those which are formed by elements 41 and 42 of FIG. 9.

The measurement of the quantity of energy Eme may likewise be employed in a circuit producing driving pulses during which the quantity of mechanical energy furnished by the motor has a fixed and predetermined value.

Such a circuit will not be represented here since it would be very similar to that of FIG. 1. In effect it is sufficient to replace in the latter gate 19 by a gate of the same type but having its inouts coupled to the outputs of counter 8 which are at the state "1" when the quantity of energy Eme is equal to this quantity of mechanical energy of predetermined value. Furthermore, elements 22 to 26 of the circuit of FIG. 1 may even be suppressed, the output Q of flip-flop 20 being then coupled directly to the input 1*c* of the pulse forming circuit 1.

It is easily seen that with such a circuit each driving pulse is interrupted as soon as the quantity of energy Eme becomes equal to the predetermined value. The quantity of mechanical energy furnished by the motor during these driving pulses is thus constant.

These last driving pulses may advantageously replace the catch-up pulses of fixed duration which are produced by certain known control circuits when the rotor of the motor fails to turn correctly in response to one of the short pulses which are normally provided.

In such a case the predetermined value mentioned hereinabove is evidently preferably that of the quantity of mechanical energy $Emm_{max}$ which the motor must furnish when the resistant torque Tr applied to its rotor has its maximum value $Tr_{max}$.

The fact that the quantity of mechanical energy Emm furnished by the motor during these pulses has a fixed value has as advantage that they never bring about a rotation of the rotor of more than one step, in opposition to that which may happen with catch-up pulses of fixed duration produced by known control circuits.

A circuit combining in the manner suggested hereinabove the production of driving pulses of relatively short fixed duration and the production of catch-up pulses during which the quantity of mechanical energy furnished by the motor is constant and predetermined, will not be described here since its realization is well known to persons skilled in the art.

It is still to be noted that the present invention is not limited to the control of stepping motors such as are regularly employed in electronic timepieces, i.e. which comprise a rotor including a permanent bipolar magnet provided in a basically cylindrical opening arranged in a stator bearing a winding, but rather may be employed to control any type of stepping motor, for instance motors the rotor of which includes a multipolar permanent magnet and/or the stator of which bears two or several windings.

What I claim is:

1. A method for controlling a stepping motor comprising a winding and a rotor magnetically coupled to said winding, said rotor being subjected to a resisting torque variable between a minimum and a maximum value, said method comprising:

applying a driving pulse to said winding each time that said rotor is to turn by one step;

measuring a first quantity of electrical energy converted into mechanical energy by said motor from the beginning of said driving pulse;

comparing said first quantity with a reference energy which is substantially equal to the quantity of electrical energy that said motor must convert into mechanical energy for said rotor to turn by just one step when said resisting torque has said minimum value;

measuring the time required for said first quantity to equal said reference energy;

determining an optimum duration of said pulse as a function of said measured time, wherein said optimum duration is the duration for which the first quantity is substantially equal to the quantity of electrical energy that the motor has to convert into mechanical energy for said rotor to turn by just one step in overcoming the resisting torque said rotor is actually subjected to during said driving pulse; and interrupting said driving pulse at the end of said optimum duration.

2. The method of claim 1 further comprising generating a detection signal when said first quantity fails to attain said reference energy over a predetermined time interval.

3. The method of claim 1 further comprising:

producing a periodic sampling signal defining a plurality of sampling instants, two consecutive sampling instants being separated by a period equal to the period of said sampling signal;

measuring a current flowing through said winding;

adjusting the current flowing through said winding during said driving pulse to a reference current by connecting said winding to a power source at each sampling instant when said current flowing in said winding is less than said reference current and disconnecting said winding from said source and short circuiting said winding at each sampling instant when said flowing current is equal to or greater than said reference current;

and wherein measuring said first quantity further comprises calculating a first expression as follows:

$$Eme_{0x}=U\cdot I_{ref}C1_x-R\cdot I^2_{ref}\Delta\cdot C2_x$$

in which $Eme_{0x}$ is said first quantity;

U is the voltage of said power source;

$I_{ref}$ is the value of said reference current;

R is the ohmic resistance of said winding;

$\Delta$ is the duration of said period of the sampling signal;

$C1_x$ is a first number equal to the number of sampling instants at which said winding is connected to said power source between an instant $t_1$ and an instant $t_x$, said instant $t_1$ being the first sampling instant when said current flowing through said winding is equal to or greater than said reference current and said instant $t_x$ being any sampling instant subsequent to said instant $t_1$; and $C2_x$ is a second number equal to the number of sampling instants between the beginning of said driving pulse and said instant $t_x$.

4. The method of claim 3 wherein calculating said first expression further comprises calculating a second expression as follows:

$$N_x=p\cdot C1_x-C2_x$$

in which p is a constant factor equal to $$\frac{U}{R\cdot I_{ref}};$$

and $N_x$ is a third number proportional to said first quantity.

5. The method of claim 3 wherein calculating said first expression further comprises calculating a third expression as follows:

$$N'_x = C1_x - \frac{1}{p}\cdot C2_x$$

in which p is a constant factor equal to $$\frac{U}{R\cdot I_{ref}};$$

and $N'_x$ is a fourth number proportional to said first quantity.

6. A method as set forth in claim 1 wherein measuring said first quantity further comprises calculating a fourth expression as follows:

$$Eme_{0x} = \int_{t_0}^{t_x} U\cdot i_s(t)\cdot dt - \int_{t_0}^{t_x} R\cdot[i_m(t)]^2\cdot dt - \int_{t_0}^{t_x} L\cdot i_m(t)\cdot\frac{di_m}{dt}\cdot dt$$

in which $t_0$ and $t_x$ are respectively the instant at which the driving pulse begins and any subsequent instant following the instant $t_0$;

$Eme_{0x}$ is said first quantity of electrical energy converted into mechanical energy between the instants $t_0$ and $t_x$;

U is the voltage of the motor energy source;

$i_s(t)$ is the current flow from said energy source;

$i_m(t)$ is the current circulating in the motor winding; and

R and L are respectively the resistance and inductance of said winding.

7. An arrangement for controlling a stepping motor comprising a winding and a rotor magnetically coupled to said winding, said rotor being subjected to a resisting torque variable between a minimum and a maximum value, said arrangement comprising:

means for applying a driving pulse to said winding each time that said rotor is to turn by one step;

means for measuring a first quantity of electrical energy converted into mechanical energy by said motor from the beginning of said driving pulse;

means for comparing said first quantity with a reference energy which is substantially equal to the quantity of electrical energy that said motor must convert into mechanical energy for said rotor to turn by just one step when said resisting torque has said minimum value;

means for measuring the time required for said first quantity to equal said reference energy;

means for determining an optimum duration of said driving pulse as a function of said measured time, wherein said optimum duration is the duration for which the first quantity is substantially equal to the quantity of electrical energy that the motor has to convert into mechanical energy for said rotor to turn by just one step in overcoming the resisting torque said rotor is actually subjected to during said driving pulse; and means for interrupting said driving pulse at the end of said optimum duration.

8. The arrangement of claim 7 further comprising means for generating a detection signal when said first quantity fails to attain said reference energy over a predetermined time interval.

9. The arrangement of claim 7 further comprising a power source and wherein said means for applying further comprises:

means for producing a periodic sampling signal defining a plurality of sampling instants, two consecutive sampling instants being separated by a period equal to the period of said sampling signal;

means for measuring a current flowing through said winding;

means responsive to said sampling signal for connecting said winding to said power source at each sampling instant when said current flowing in said winding is less than a reference current and for disconnecting said winding from said source and short circuiting said winding at each sampling instant when said flowing current is equal to or greater than said reference current;

and wherein said means for measuring said first quantity further comprises means for calculating a first expression as follows:

$$Eme_{0x} = U \cdot I_{ref} \Delta \cdot C1_x - R \cdot I^2_{ref} \Delta \cdot C2_x$$

in which $Eme_{0x}$ is said first quantity;

U is the voltage of said power source;

$I_{ref}$ is the value of said reference current;

R is the ohmic resistance of said winding;

$\Delta$ is the duration of said period of the sampling signal;

$C1_x$ is a first number equal to the number of sampling instants at which said winding is connected to said power source between an instant $t_1$ and an instant $t_x$, said instant $t_1$ being the first sampling instant when said current flowing through said winding is equal to or greater than said reference current and said instant $t_x$ being any sampling instant subsequent to said instant $t_1$; and $C2_x$ is a second number equal to the total number of sampling instants between the beginning of said driving pulse and said instant $t_x$.

10. The arrangement of claim 9 wherein said calculating means further comprises means for calculating a second expression as follows:

$$N_x = p \cdot C1_x - C2_x$$

in which p is a constant factor equal to $$\frac{U}{R \cdot I_{ref}};$$

and $N_x$ is a third number proportional to said first quantity.

11. The arrangement of claim 9 wherein said calculating means further comprises means for calculating a third expression as follows:

$$N'_x = C1_x - \frac{1}{p} \cdot C2_x$$

in which p is a constant factor equal to $$\frac{U}{R \cdot I_{ref}};$$

and $N'_x$ is a fourth number proportional to said first quantity.

12. An arrangement as set forth in claim 7 wherein said means for measuring said first quantity further comprises means for calculating a fourth expression as follows:

$$Eme_{0x} = \int_{t_0}^{t_x} U \cdot i_s(t) \cdot dt - \int_{t_0}^{t_x} R \cdot [i_m(t)]^2 \cdot dt - \int_{t_0}^{t_x} L \cdot i_m(t) \cdot \frac{di_m}{dt} \cdot dt$$

in which $t_0$ and $t_x$ are respectively the instant at which the driving pulse begins and any subsequent instant following the instant $t_0$;

$Eme_{0x}$ is said first quantity of electrical energy converted into mechanical energy between the instants $t_0$ and $t_x$;

U is the voltage of the motor energy source;

$i_s(t)$ is the current flow from said energy source;

$i_m(t)$ is the current circulating in the motor winding; and

R and L are respectively the resistance and inductance of said winding.

13. A method for measuring a first quantity of electrical energy converted into mechanical energy by a stepping motor comprising a winding and a rotor magnetically coupled to said winding, said electrical energy being converted during a driving pulse which is applied to said winding, said method comprising:

producing a periodic sampling signal defining a plurality of sampling instants, two consecutive sampling instants being separated by a period equal to the period of said sampling signal;

measuring a current flowing through said winding;

adjusting the current flowing through said winding during said driving pulse to a reference current by connecting said winding to a power source at each sampling instant when said current flowing in said winding is less than said reference current and disconnecting said winding from said source and short circuiting said winding at each sampling instant when said flowing current is equal to or greater than said reference current; and calculating a first expression as follows:

$$Eme_{0x} = U \cdot I_{ref} \Delta \cdot C1_x - R \cdot I^2_{ref} \Delta \cdot C2_x$$

in which $Eme_{0x}$ is said first quantity;

U is the voltage of said power source;

$I_{ref}$ is the value of said reference current;

R is the ohmic resistance of said winding;

$\Delta$ is the duration of said period of the sampling signal;

$C1_x$ is a first number equal to the number of sampling instants at which said winding is connected to said power source between an instant $t_1$ and an instant $t_x$, said instant $t_1$ being the first sampling instant when said current flowing through said winding is equal to or greater than said reference current and said instant $t_x$ being any sampling instant subsequent to said instant $t_1$; and $C2_x$ is a second number equal to the total number of sampling instants between the beginning of said driving pulse and said instant $t_x$.

14. The method of claim 13 wherein calculating said first expression further comprises calculating a second expression as follows:

$$N_x = p \cdot C1_x - C2_x$$

in which p is a constant factor equal to $$\frac{U}{R \cdot I_{ref}};$$

and $N_x$ is a third number proportional to said first quantity.

15. The method of claim 13 wherein calculating said first expression further comprises calculating a third expression as follows:

$$N'_x = C1_x - \frac{1}{p} \cdot C2_x$$

in which p is a constant factor equal to $$\frac{U}{R \cdot I_{ref}};$$

and $N'_x$ is a fourth number proportional to said first quantity.

16. An arrangement for measuring a first quantity of electrical energy converted into mechanical energy by a stepping motor comprising a winding and a rotor magnetically coupled to said winding, said electrical energy being converted during a driving pulse which is applied to said winding, said arrangement comprising:

a power source;

means for producing a periodic sampling signal defining a plurality of sampling instants, two consecutive sampling instants being separated by a period equal to the period of said sampling signal;

means for measuring a current flowing through said winding;

means responsive to said sampling signal for connecting said winding to said power source at each sampling instant when said current flowing in said winding is less than a reference current and for disconnecting said winding from said source and short circuiting said winding at each sampling instant when said flowing current is equal to or greater than said reference current; and means for calculating a first expression as follows:

$$Eme_{0x} = U \cdot I_{ref} \Delta \cdot C1_x - R \cdot I^2_{ref} \Delta \cdot C2_x$$

in which $Eme_{0x}$ is said first quantity;

U is the voltage of said power source;

$I_{ref}$ is the value of said reference current;

R is the ohmic resistance of said winding;

$\Delta$ is the duration of said period of the sampling signal;

$C1_x$ is a first number equal to the number of sampling instants at which said winding is connected to said power source between an instant $t_1$ and an instant $t_x$, said instant $t_1$ being first sampling instant when said current flowing through said winding is equal to or greater than said reference current and said instant $t_x$ being any sampling instant subsequent to said instant $t_1$; and $C2_x$ is a second number equal to the total number of sampling instants between the beginning of said driving pulse and said instant $t_x$.

17. The arrangement of claim 16 wherein said calculating means further comprises means for calculating a second expression as follows:

$$N_x = p \cdot C1_x - C2_x$$

in which p is a constant factor equal to $$\frac{U}{R \cdot I_{ref}};$$

and $N_x$ is a third number proportional to said first quantity.

18. The arrangement of claim 16 wherein said calculating means further comprises means for calculating a third expression as follows:

$$N'_x = C1_x - \frac{1}{p} \cdot C2_x$$

in which p is a constant factor equal to $$\frac{U}{R \cdot I_{ref}};$$

and $N'_x$ is a fourth number proportional to said first quantity.

* * * * *